United States Patent
Chang et al.

(10) Patent No.: US 10,596,801 B2
(45) Date of Patent: Mar. 24, 2020

(54) THREE-DIMENSIONAL PRINTING APPARATUS AND INKJET COLORING METHOD THEREOF

(71) Applicants: XYZprinting, Inc., New Taipei (TW); Kinpo Electronics, Inc., New Taipei (TW)

(72) Inventors: Yu-Chuan Chang, New Taipei (TW); Hsin-Ta Hsieh, New Taipei (TW)

(73) Assignees: XYZprinting, Inc., New Taipei (TW); Kinpo Electronics, Inc., New Taipei (TW)

( * ) Notice: Subject to any disclaimer, the term of this patent is extended or adjusted under 35 U.S.C. 154(b) by 277 days.

(21) Appl. No.: 15/458,980

(22) Filed: Mar. 15, 2017

(65) Prior Publication Data
US 2018/0186089 A1 Jul. 5, 2018

(30) Foreign Application Priority Data
Jan. 5, 2017 (TW) .............................. 106100261 A

(51) Int. Cl.
*B29C 67/00* (2017.01)
*B33Y 10/00* (2015.01)
(Continued)

(52) U.S. Cl.
CPC ............ *B33Y 10/00* (2014.12); *B29C 64/106* (2017.08); *B29C 64/118* (2017.08);
(Continued)

(58) Field of Classification Search
None
See application file for complete search history.

(56) References Cited

U.S. PATENT DOCUMENTS

2007/0146734 A1  6/2007  Taniuchi et al.
2014/0291886 A1* 10/2014  Mark .................... B29C 70/384
                                                    264/163

FOREIGN PATENT DOCUMENTS

JP      2007196668      8/2007
JP      2015221568      12/2015
(Continued)

OTHER PUBLICATIONS

Office Action of Taiwan Counterpart Application, dated Dec. 3, 2018, pp. 1-7.
(Continued)

*Primary Examiner* — Nathan T Leong
(74) *Attorney, Agent, or Firm* — JCIPRNET

(57) ABSTRACT

A three-dimensional (3-D) printing apparatus and an inkjet coloring method thereof are provided. The 3-D printing apparatus includes a platform, a three-dimensional printing head, an inkjet head and the method includes following steps. A layer thickness of at least one layer object forming a 3-D object is obtained. An ink discharge volume of an ink layer is adjusted according to the layer thickness, wherein the ink discharge volume is in positive correlation with the layer thickness. A building material is melted and printed out on the platform according to the layer thickness by the three-dimensional printing head to form the at last one layer object. Ink is dispensed on the at last one layer object according to the adjusted ink discharge volume by the inkjet head to form the ink layer.

15 Claims, 4 Drawing Sheets

(51) Int. Cl.
  *B41J 2/21* (2006.01)
  *G05B 19/4099* (2006.01)
  *B29C 64/106* (2017.01)
  *B29C 64/118* (2017.01)
  *B29C 64/386* (2017.01)
  *B33Y 30/00* (2015.01)
  *B29K 55/02* (2006.01)
  *B29K 67/00* (2006.01)
  *B33Y 50/02* (2015.01)

(52) U.S. Cl.
  CPC ........ *B29C 64/386* (2017.08); *B29C 67/0007* (2013.01); *B41J 2/21* (2013.01); *G05B 19/4099* (2013.01); *B29K 2055/02* (2013.01); *B29K 2067/046* (2013.01); *B33Y 30/00* (2014.12); *B33Y 50/02* (2014.12); *G05B 2219/49007* (2013.01)

(56) References Cited

FOREIGN PATENT DOCUMENTS

| | | |
|---|---|---|
| JP | 2016097632 | 5/2016 |
| JP | 2016185625 | 10/2016 |
| WO | 2015163776 | 10/2015 |
| WO | 2015199019 | 12/2015 |
| WO | 2016142930 | 9/2016 |

OTHER PUBLICATIONS

"Office Action of Japan Counterpart Application," dated Mar. 5, 2019, p. 1-3.

\* cited by examiner

THREE-DIMENSIONAL PRINTING APPARATUS AND INKJET COLORING METHOD THEREOF

CROSS-REFERENCE TO RELATED APPLICATION

This application claims the priority benefit of Taiwan application serial no. 106100261, filed on Jan. 5, 2017. The entirety of the above-mentioned patent application is hereby incorporated by reference herein and made a part of this specification.

BACKGROUND

Technical Field

The disclosure relates to a printing apparatus, and more particularly to a three-dimensional (3-D) printing apparatus and an inkjet coloring method thereof.

Description of Related Art

With the advance in computer-aided manufacturing (CAM), the manufacturing industry has developed a three-dimensional (3-D) printing technology to rapidly convert original design concept into physical objects. The 3-D printing technology is actually a general designation of a series of rapid prototyping (RP) techniques. A basic principle thereof is an additive manufacturing by using a RP machine to form a sectional shape of a workpiece in an X-Y plane through scanning and to intermittently shift by a layer thickness along a Z-axis, so as to finally form a 3-D object. The 3-D printing technology is not limited to any geometric shape, and the more complex the components are, the more excellent the RP technology can demonstrate. The 3-D printing technology may greatly save manpower and processing time. With a demand of shortest time, a digital 3-D model designed by using a 3-D computer-aided design (CAD) software may be truthfully presented as touchable.

Taking a fused deposition modeling (FDM) as an example, a building material is made into wires thereby, and then the building material after being heated and melted is stacked layer by layer on a forming platform according to the desired shape/contour, so as to form a 3-D object. Therefore, in the conventional color FDM 3-D printing method, the exterior is usually colored after the 3-D object is completed, or the 3-D object is manufactured by using a colored forming material. In the former case, however, the color ink is only applied to the outer surface of the 3-D object which may be slightly inferior in color properties and variability. On the other hand, in the latter case, the forming wire materials in different colors has to be repeatedly changed and used in order to achieve a multiple-color effect, which results in unsatisfactory efficiency in manufacturing a colored three-dimensional object. Thus, a method of printing a colored 3-D object is recently provided, in which layer objects for forming a 3-D object are colored layer by layer using an inkjet mechanism in the process of manufacturing the 3-D object. However, if a thickness of each layer object is large, the layer object cannot be entirely dyed by the color ink, such that unexpected stripes may occur to the appearance of the 3-D object due to the incompletely dyed layer objects. Accordingly, how to improve the aforementioned issues has become one of the subjects that the technicians have to consider.

SUMMARY

Accordingly, the disclosure provides a three-dimensional (3-D) printing apparatus and an inkjet coloring method thereof capable of providing a 3-D object printed thereby with preferable color properties and color uniformity.

The disclosure provides an inkjet coloring method of a 3-D printing apparatus including a platform, a 3-D printing head and an inkjet head is provided. The method includes the following steps. A layer thickness of at least one layer object for forming a 3-D object is obtained. An ink discharge volume of an ink layer is adjusted according to the layer thickness, wherein the ink discharge volume is in positive correlation with the layer thickness. A building material is melted and printed out on the platform according to the layer thickness by the 3-D printing head to form a layer object. At least one ink is applied on the at last one layer object according to the ink discharge volume by the inkjet head to form the ink layer.

According to another embodiment of the disclosure, a 3-D printing apparatus including a 3-D printing head, an inkjet head, a platform and a controller is provided. The 3-D printing head includes a melt nozzle. The inkjet head includes an ink nozzle. The platform is disposed under the 3-D printing head and the inkjet head. The controller is coupled to the 3-D printing head and the inkjet head. The controller obtains a layer thickness of at least one layer object for forming a 3-D object and adjusts an ink discharge volume of an ink layer according to the layer thickness, wherein the ink discharge volume is in positive correlation with the layer thickness. The controller controls the 3-D printing head to melt and print out a building material on the platform according to the layer thickness to form the at least one layer object and controls the inkjet head to apply at least one ink on the at last one layer object according to the ink discharge volume, so as to form the ink layer.

To sum up, in the embodiments of the disclosure, the layer object is first formed on the platform by the 3-D printing head, and the ink layer is then formed by applying the ink on the layer object using the inkjet head. The ink discharge volume sprayed from by the inkjet head is adaptively adjusted according to the layer thickness of the layer object, such that the ink of the ink layer can ideally applied to the entire layer object. In this way, the phenomenon that the layer object is unevenly dyed can be improved, so as to effectively enhance quality of color 3-D printing.

In order to make the aforementioned and other features and advantages of the disclosure more comprehensible, several embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EMBODIMENTS

Figure 1:
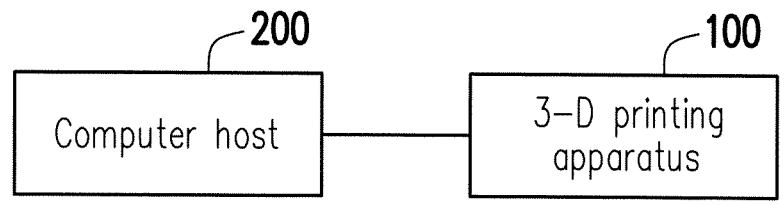
FIG. 1 is a schematic block diagram illustrating a working scenario of a three-dimensional (3-D) printing apparatus according to an embodiment of the disclosure.

Reference will now be made in detail to the exemplary embodiments of the disclosure, examples of which are illustrated in the accompanying drawings. Wherever possible, the same reference numbers are used in the drawings and the description to refer to the same or like parts.

FIG. 1 is a schematic block diagram illustrating a working scenario of a three-dimensional (3-D) printing apparatus according to an embodiment of the disclosure. Referring to FIG. 1, a three-dimensional (3-D) printing apparatus 100 of the present embodiment is adapted to print out a 3-D object according to 3-D model information. Furthermore, a computer host 200 is an apparatus with computation capability, such as a notebook computer, a tablet computer or a desktop computer, but the type of the computer host 200 is not particularly limited in the disclosure. The computer host 200 may edit and process a 3-D model of a 3-D object and transmit related 3-D model information to the 3-D printing apparatus 100, such that the 3-D printing apparatus 100 may print out a 3-D object according to the 3-D model information. In the present embodiment, the 3-D model may be a 3-D digital image file which is constructed by the computer host 200 through computer-aided design (CAD) or animation modeling software, for example, and the computer host 200 performs a layer processing operation on the 3-D model to obtain 3-D model information associated with a plurality of layer objects, such that the 3-D printing apparatus 100 may sequentially print out each layer object according to the 3-D model information corresponding to the layer object, and finally, a complete 3-D object is formed. It should be mentioned that the 3-D model information further includes color information corresponding to each layer object. The 3-D printing apparatus 100 may color each layer object according to the color information corresponding to the layer object, so as to finally form a colored 3-D object.

Figure 2:
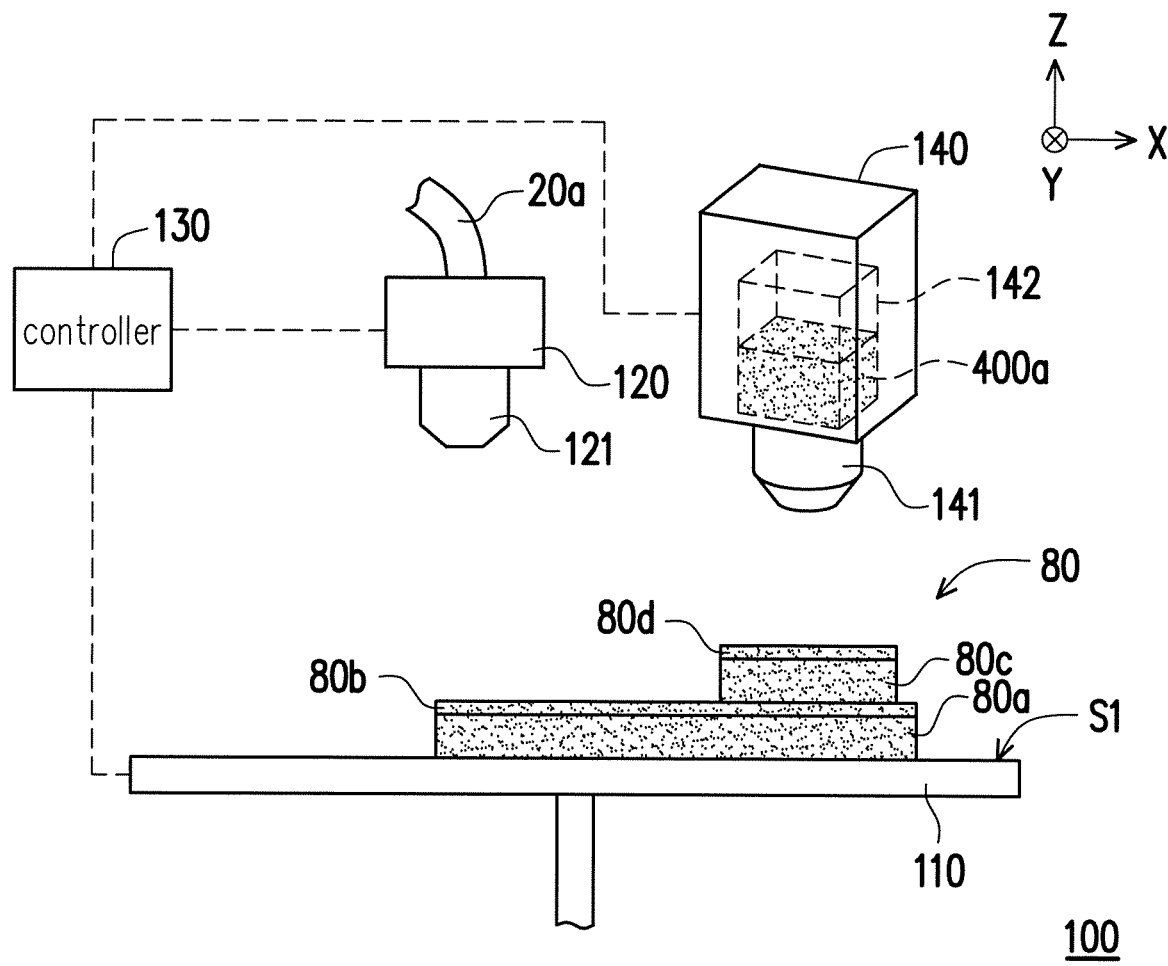
FIG. 2 is a schematic diagram illustrating a 3-D printing apparatus according to an embodiment of the disclosure.

FIG. 2 is a schematic diagram illustrating a 3-D printing apparatus according to an embodiment of the disclosure. Referring to FIG. 2, the 3-D printing apparatus 100 includes a platform 110, a 3-D printing head 120, an inkjet head 140 and a controller 130. A coordinate system is provided in the meantime for conveniently describing the related components and motion states thereof. The platform 110 includes a carrying surface S1 used for carrying a 3-D object 80 under printing. The platform 110 is disposed under the 3-D printing head 120 and the inkjet head 140.

Specifically, in the present embodiment, the 3-D printing head 120 is configured to move along an X-Y plane and along a normal direction of the X-Y plane (which is the Z-axial direction). A building material 20a is adapted to be fed into a melt nozzle 121 through a material feeding pipe of the 3-D printing head 120 to be heated, melted, and then extruded from the melt nozzle 121 to form a plurality of layer objects (which are illustrated as layer objects 80a and 80c in FIG. 2, for example) layer by layer on the carrying surface S1 of the platform 110. In this way, the layer objects 80a and 80c which are formed layer by layer are stacked on the carrying surface S1 to form the 3-D object 80. To be specific, the building material 20a may be a thermal melting material manufactured by fused filament fabrication (FFF), melted and extrusion modeling or the like, which is not limited in the disclosure.

In the present embodiment, the inkjet head 140 includes an ink nozzle 141 used to apply ink 400a on each layer object layer by layer to form a plurality of ink layers (which are illustrated as ink layers 80b and 80d in FIG. 2, for example). The aforementioned operation of forming the ink layers 80b and 80d on the layer objects 80a and 80c refers to overlapping the ink 400a on a surface of each of the layer objects 80a and 80c and at the same time, dying the internal of each of the layer objects 80a and 80c. Thus, the inkjet head 140 may include an ink cartridge 142 and an inkjet nozzle 141. The ink cartridge 142 is filled with the ink 400a and communicates with the inkjet nozzle 141, and the inkjet nozzle 141 is used to spray the ink 400a from the ink cartridge 142 onto the layer objects 80a and 80c to color the layer objects 80a and 80c, so as to form the ink layers 80b and 80d on the layer objects 80a and 80c. Although only the ink cartridge 142 is illustrated in FIG. 2, the number of the ink cartridges and the number of the colors of the ink are not limited in the disclosure. In an embodiment, the inkjet head 140 is similar to a color inkjet system used by a two-dimensional color printing apparatus, which is capable of applying a plurality of color ink corresponding to different colors on the layer objects 80a and 80c according to a forming ratio of each color, so as to form the ink layers 80b and 80d. The colors of the color ink include cyan, magenta, yellow and black in accordance with printing primary colors, which are not limited in the disclosure.

In this configuration, the 3-D printing head 110 may, after printing one layer object 80a on the platform 110, color the layer object 80a through applying the ink layer 80b on an upper surface of the layer object 80a by using the inkjet head 140 in the present embodiment. Then, the 3-D printing head 110 may, after printing another layer object 80b above the platform 110, color the layer object 80c through applying the ink layer 80d on an upper surface of the layer object 80c by using the inkjet head 140. In this way, the layer objects 80a and 80c and the ink layers 80b and 80d are alternatively stacked, so as to form the color 3-D object 80.

The controller 130 is coupled to the platform 110, the 3-D printing head 120 and the inkjet head 140, used to read the 3-D model information provided by the computer host 100 and control overall operation of the 3-D printing apparatus 100 according to the 3-D model information, so as to print out the 3-D object 80. For instance, the controller 130 may control a moving path of the 3-D printing head 120 according to the 3-D model information, as well as may also control ratios of spraying the color ink in different colors according to the 3-D model information. The controller 130 is a device with a computation capability, for example, a central processing unit (CPU), a chipset, a microprocessor, an embedded controller or the like, which is not limited herein.

In an embodiment of the disclosure, an ink discharge volume of the inkjet head 140 is determined according to a layer thickness of the layer object, where the ink discharge volume is in positive correlation with the layer thickness of each layer object. In general, the ink discharge volume of the inkjet head 140 is increased as the layer thickness is increased. When receiving the 3-D model information related to each layer object, the 3-D printing apparatus 100 may determine the ink discharge volume of the inkjet head 140 according to a layer thickness notified by the computer host 200. The 3-D printing apparatus 100 may correspondingly adjust the ink discharge volume, for example, by looking up in a table or according to a reference thickness.

Figure 3:
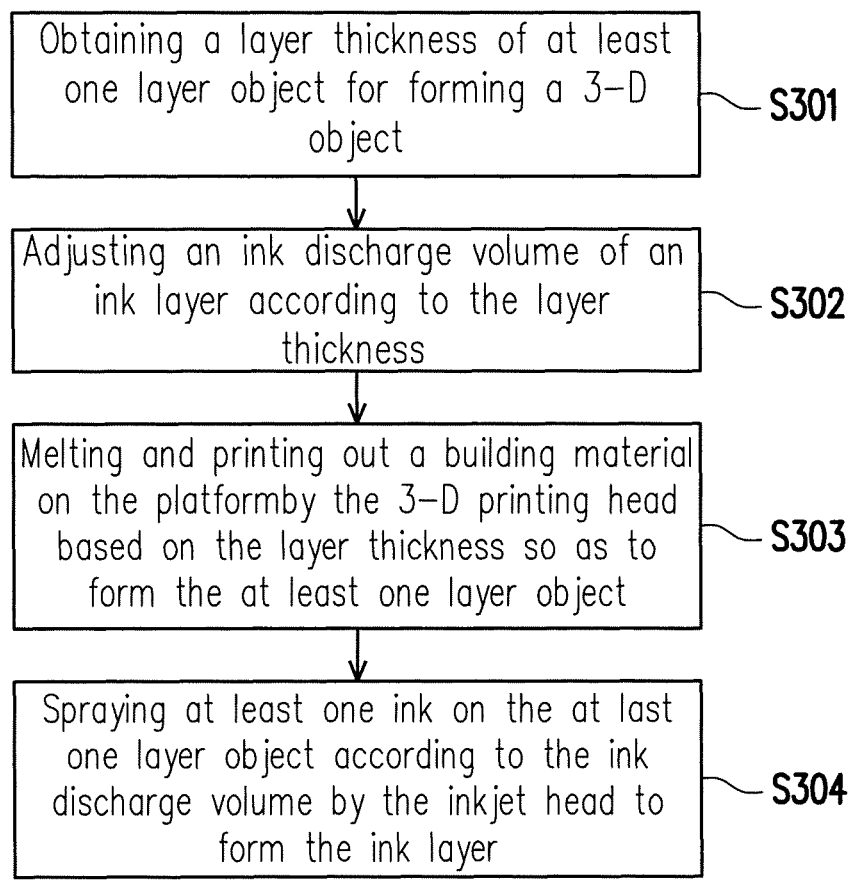
FIG. 3 is a flowchart illustrating an inkjet coloring method of a 3-D printing apparatus according to an embodiment of the disclosure.

In order to describe an inkjet coloring method of the disclosure, an embodiment is provided below. FIG. 3 is a flowchart illustrating an inkjet coloring method of a 3-D printing apparatus according to an embodiment of the disclosure. The method of the present embodiment is applicable to the 3-D printing apparatus 100 illustrated in FIG. 2, and detailed steps of the inkjet coloring method of the present embodiment will be described in detail below with reference to each element in the 3-D printing apparatus 100.

Referring to both FIG. 2 and FIG. 3, in step S301, the controller 130 obtains a layer thickness of at least one layer object 80a or 80c used for forming a 3-D object 80. In step S302, the controller 130 adjusts an ink discharge volume of an ink layer according to the layer thickness, where the ink discharge volume is in positive correlation with the layer thickness. In another exemplary embodiment, when the ink of the inkjet head 140 includes a plurality of color ink corresponding to difference colors, the controller 130 may adjust the ink discharge volume of each color ink in the ink layer according to the layer thickness. For instance, the controller 130 may determine the ink discharge volumes corresponding to four types of ink in four colors, i.e., cyan, magenta, yellow and black, according to the layer thickness.

Figure 4A:
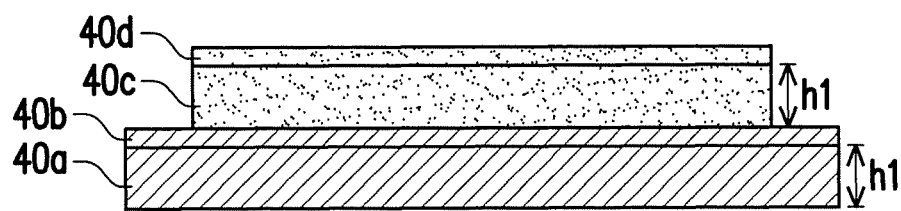
FIG. 4A and FIG. 4B are schematic diagrams illustrating the layer object and the ink layer according to an embodiment of the disclosure.
Figure 4B:
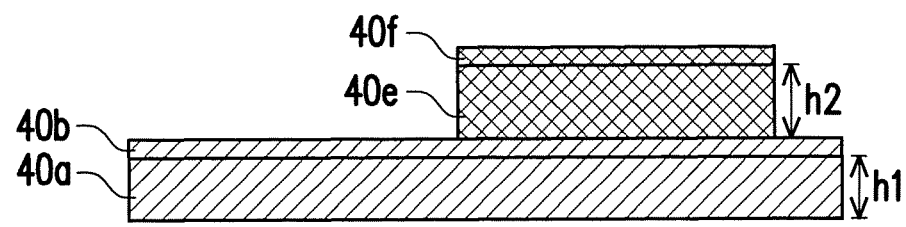

In addition, the layer thickness of each layer object for forming the 3-D object may be the same or different. Thus, if the layer thicknesses of all the layer objects are the same, the controller 130 may determine the ink discharge volume of each layer object according to one layer thickness. If the layer thicknesses of all the layer objects are different, the controller 130 may determine the ink discharge volume of each layer object according to one or more layer thicknesses. For instance, FIG. 4A and FIG. 4B are schematic diagrams illustrating the layer objects and the ink layers according to an embodiment of the disclosure. Referring to FIG. 4A first, if layer objects 40a and 40c both have the same layer thickness h1, the controller 130 may control the inkjet head 140 to spray the ink 400a according to an ink discharge volume determined based on the thickness h1, so as to form ink layers 40b and 40d. On the other hand, referring to FIG. 4B, if layer objects 40a and 40e have different layer thicknesses from each other (i.e., the layer thickness of the layer object 40a is the thickness h1, and the layer thickness of the layer object 40e is a thickness h2), the controller 130 may control the inkjet head 140 to spray the ink 400a according to the ink discharge volume determined based on the thickness h1, so as to form the ink layer 40b, and control the inkjet head 140 to spray the ink 400a according to an ink discharge volume determined based on the thickness h2, so as to form an ink layer 40f. If the thickness h2 is greater than the thickness h1, the ink discharge volume per unit area used to form the ink layer 40f is greater than the ink discharge volume per unit area used to form the ink layer 40d.

Continuously referring to FIG. 3, in step S303, the controller 130 controls the 3-D printing head 120 to melt and print out the building material 20a on the platform 110 according to the layer thickness, so as to form the layer objects 80a and 80c. In step S304, the controller 130 controls the inkjet head 140 to apply the at least one ink 400a on the layer objects 80a and 80c according to the adjusted ink discharge volume, so as to form the ink layers 80b and 80d. Specifically, the building material 20a is, for example, a transparent or white material. The controller 130 may control an extrusion amount of the building material per unit time for the 3-D printing head 120 according to the layer thickness and control a moving path of the 3-D printing head 120 on the X-Y plane according to sectional contours of the layer objects 80a and 80c. Thus, the layer objects 80a and 80c which are presented in the transparent or white color and have the layer thicknesses are cured and formed on the platform 110. Thereafter, the controller 130 may control the inkjet head 140 to apply the ink 400a on the layer objects 80a and 80c according to the adjusted ink discharge volume, such that the layer objects 80a and 80c presented in the transparent or white color are dyed using the color of the ink 400a to form the ink layers 80b and 80d. For instance, when the inkjet head 140 uses a piezoelectric inkjet technique, the ink discharge volume of the inkjet head 140 may be adjusted by changing a voltage applied to an electronic element of the inkjet nozzle 141. Thus, in an embodiment of the disclosure, the controller 130 may adjust the voltage applied to the electronic element of the inkjet nozzle 141 according to the layer thickness, so as to adjust the ink discharge volume by adjusting a droplet size of the ink ejected from the inkjet nozzle 141.

It should be mentioned that controller 130 may employ the layer thickness as a decision factor by using a lookup table or according to a specific equation, so as to determine the ink discharge volume. In an embodiment, the reference thickness or a predetermined reference value corresponding to the reference thickness (which is a predetermined ink discharge volume) may be previously determined, such that the controller 130 may determine an ideal ink discharge volume of the layer thickness according to the predetermined reference value and a relationship between the layer thickness and the reference thickness. For example, when a difference between the layer thickness and the reference thickness is greater than a first threshold, the predetermined reference value may be adjusted by being added or subtracted by an adjustment gap to obtain the adjusted ink discharge volume. When the difference between the layer thickness and the reference thickness is greater than a second threshold which is greater than the first threshold, the predetermined reference value may be adjusted by being added or subtracted by the doubled adjustment gap to obtain the adjusted ink discharge volume.

On the other hand, how the controller determines the ink discharge volume according to a specific equation will be described below. In an exemplary embodiment, the controller may first obtain a relation polynomial, substitute the layer thickness into the relation polynomial, and adjust the ink discharge volume from the predetermined reference value corresponding to the reference thickness to an ideal value.

Figure 5A:
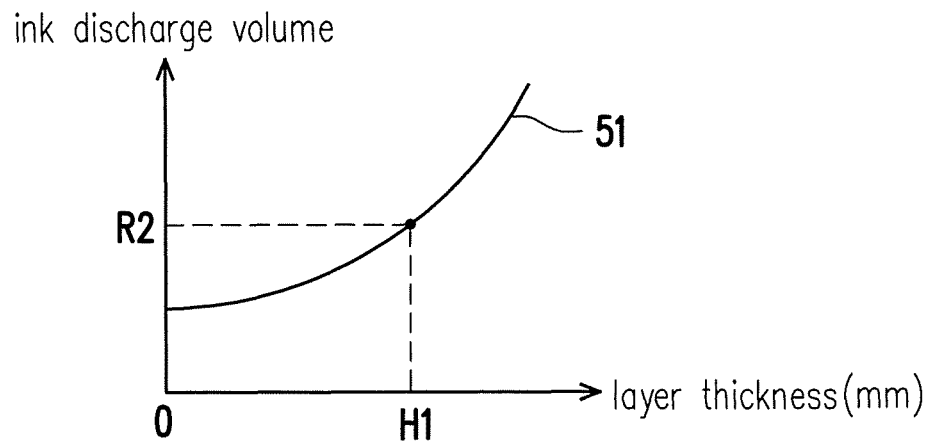
FIG. 5A is a schematic diagram illustrating an example of determining the ink discharge volume according to a relation polynomial according to an embodiment of the disclosure.

FIG. 5A is a schematic diagram illustrating an example of determining the ink discharge volume according to a relation polynomial according to an embodiment of the disclosure. The relation polynomial used for determining the ink discharge volume may be a quadratic polynomial, as illustrated in formula (1).

$$C'=a \cdot h^2+bh+c, \ a>0, h>0 \tag{1}$$

Therein, C' represents an ideal value of the ink discharge volume, c represents a constant and is greater than 0, h represents the layer thickness and is greater than 0, and a and b represent adjustment coefficients. The adjustment coefficients a and b and the constant c may be generated through a test and an experiment taken place in advance. For example, a designer may obtain a plurality of testing layer thicknesses and their respectively corresponding optimal ink discharge volumes through tests and approximate a curve equation according to the test data, so as to finally obtain the adjustment coefficients a and b and the constant c. In this way, according to formula (1), a corresponding relationship 51 illustrated in FIG. 5A may be obtained. In the example illustrated in FIG. 5A, if it is assumed that the layer thickness of the layer object is a thickness H1, the controller 130 may substitute the thickness H1 into formula (1) and accordingly determine that the ideal value of the ink discharge volume is R2. By observing the corresponding relationship 51, in the present implementation example, the layer thickness is in positive correlation with the ink discharge volume. Additionally, the ink discharge volumes of the color ink in different colors may be determined according to formula (1) and the corresponding relationship 51 illustrated in FIG. 5A.

Figure 5B:
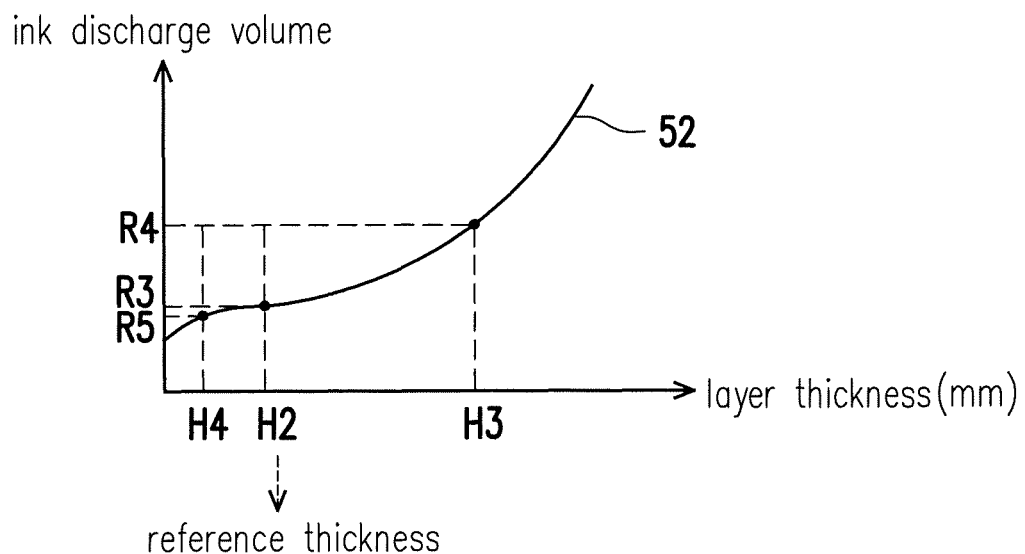
FIG. 5B is a schematic diagram illustrating an example of determining the ink discharge volume according to a relation polynomial according to an embodiment of the disclosure.

FIG. 5B is a schematic diagram illustrating an example of determining the ink discharge volume according to a relation polynomial according to an embodiment of the disclosure. In the implementation example, it is assumed that a reference thickness is H2, but the disclosure is not limited thereto. A relation polynomial used for determining the ink discharge volume may be a quadratic polynomial, as illustrated in formula (2).

$$C' = a \cdot (h - hp)^2 + b(h - hp) + c, \quad \begin{cases} \text{if } h \geq hp, \text{ then } a > 0 \\ \text{if } hp > h > 0, \text{ then } a < 0 \end{cases} \quad (2)$$

Therein, C' represents an ideal value of the ink discharge volume, c represents a predetermined reference of the ink discharge volume of a reference thickness, h represents a layer thickness and is greater than 0, hp represents the reference thickness, and a and b represent adjustment coefficients. Thereby, a corresponding relationship 52 illustrated in FIG. 5B may be obtained according to formula (2). In the example illustrated in FIG. 5B, the predetermined reference value of the ink discharge volume is used as a based value employed for adjusting the ink discharge volume, the predetermined reference value of the ink discharge volume is R3 (i.e., the constant term c of formula (2) is R3) corresponding to the reference thickness which is predetermined as a thickness H2 (i.e., hp in formula (2) is H2). Thus, if it is assumed that the layer thickness of the layer object is the same as the reference thickness, i.e., the thickness H2, the controller 130 may substitute the thickness H2 into formula (2) and accordingly determine that the ideal value of the ink discharge volume is R3. Namely, when the layer thickness of the layer object is equal to the reference thickness, the ideal value of the ink discharge volume is equal to the predetermined reference value. If it is assumed that the layer thickness of the layer object is a thickness H3 which is greater than the reference thickness, the controller 130 may substitute the thickness H3 into formula (2) and accordingly determine that the ideal value of the ink discharge volume is R4 which is greater than the predetermined reference value. If it is assumed that the layer thickness of the layer object is a thickness H4 which is less than the reference thickness, the controller 130 may substitute the thickness H4 into formula (2) and accordingly determine that the ideal value of the ink discharge volume is R5 which is less than the predetermined reference value. By observing the corresponding relationship 52, in the present implementation example, the layer thickness is in positive correlation with the ink discharge volume. Additionally, the ink discharge volumes of the color ink in different colors may be determined according to formula (2) and the corresponding relationship 52 illustrated in FIG. 5B. However, the examples in FIG. 5A and FIG. 5B are only exemplarily illustrated and construe no limitations to the disclosure.

It is to be mentioned that a degree of the ink permeating into the building material varies with the material types. Thus, in an embodiment, the controller may further select a corresponding relation polynomial from a plurality of preset polynomials according to the material type of the building material 20a, so as to determine the optimal ink discharge volume according to both the material type of the building material and the layer thickness. The preset polynomials described above are previously recorded in a recording medium, for example, and thus, when obtaining the material type of the building material 20a, the 3-D printing apparatus 100 may select a relation polynomial corresponding to the currently used material type from the preset polynomials. For instance, when the material type of the building material 20a is a polylactic acid (PLA), the controller 130 may correspondingly select a relation polynomial corresponding to the PLA. When the material type of the building material 20a is an acrylonitrile butadiene styrene (ABS) resin, the controller 130 may correspondingly select a relation polynomial corresponding to the ABS resin.

To summarize, in the embodiments of the disclosure, after the layer object is formed by the 3-D printing head on the forming platform, the ink layer is directly formed on and directly dyes the layer object by the inkjet head and so repeated for several times, the layer objects and the ink layers are alternatively stacked in sequence, so as to form the color 3-D object. In this way, the structure of each layer of the 3-D object has a colored appearance that the overall color properties are enhanced, and different parts of each color-ink layer may have different colors to improve the color variability. In addition, the ink discharge volume of the inkjet head can be determined according to the layer thickness of the layer object, such that the phenomenon that the ink is incapable of completely applying to the bottom of the layer object can be avoided. Moreover, the ink discharge volume can also be adjusted according to both the type of the building material and the layer thickness. In this way, each layer object can be ideally dyed, such that the color 3-D object composed of the layer objects can be provided with uniform color rendering effect.

Although the disclosure has been described with reference to the above embodiments, it will be apparent to one of the ordinary skill in the art that modifications to the described embodiment may be made without departing from the spirit of the disclosure. Accordingly, the scope of the disclosure will be defined by the attached claims not by the above detailed descriptions.

What is claimed is:

1. An inkjet coloring method of a three-dimensional (3-D) printing apparatus comprising:

providing the 3-D printing apparatus comprising a platform, a 3D printing head and an inkjet head, wherein the 3-D printing head comprises a melt nozzle, the inkjet head comprises an ink nozzle, and the platform is disposed under the 3-D printing head and the inkjet head;

obtaining, by a controller coupled to the 3-D printing head and the inkjet head, a layer thickness of a layer object for forming a 3-D object;

adjusting, by the controller, an ink discharge volume of an ink layer corresponding to the layer object according to the layer thickness, wherein the ink discharge volume is in positive correlation with the layer thickness of the layer object;

melting and printing out, by the 3-D printing head controlled by the controller, a building material on the platform according to the layer thickness by the 3-D printing head to form the layer object; and then applying, by the inkjet head controlled by the controller, at least one ink from the ink nozzle on an upper surface of the layer object according to the ink discharge volume by the inkjet head, so as to form the ink layer over the layer object; and after the ink layer formed on the layer object, melting and printing out, by the 3-D printing head controlled by the controller, the building material on the platform according to another layer thickness to form another layer object over the ink layer and then applying, by the inkjet head controlled by the controller, the ink on an upper surface of the another layer object according to another ink discharge volume to form another ink layer over the another layer object.

2. The inkjet coloring method according to claim 1, wherein the ink comprises a plurality of color ink respectively corresponding to different colors and the step of adjusting the ink discharge volume of the ink layer according to the layer thickness comprises:

adjusting, by the controller, the ink discharge volume of each color ink in the ink layer according to the layer thickness.

3. The inkjet coloring method according to claim 2, wherein the colors of the color ink comprises cyan, magenta, yellow and black in accordance with printing primary colors.

4. The inkjet coloring method according to claim 1, the step of adjusting the ink discharge volume of the ink layer according to the layer thickness comprises:

obtaining, by the controller, a relation polynomial; and adjusting, by the controller, the ink discharge volume from a predetermined reference value corresponding to a reference thickness to an ideal value by substituting the layer thickness into the relation polynomial.

5. The inkjet coloring method according to claim 4, wherein a constant term of the relation polynomial is the predetermined reference value.

6. The inkjet coloring method according to claim 4, wherein the relation polynomial is a quadratic polynomial.

7. The inkjet coloring method according to claim 4, further comprising:

selecting, by the controller, the relation polynomial from a plurality of preset polynomials according to a material type of the building material.

8. A three-dimensional (3-D) printing apparatus, comprising:

a 3-D printing head, comprising a melt nozzle;

an inkjet head, comprising an ink nozzle;

a platform, disposed under the 3-D printing head and the inkjet head; and a controller, coupled to the 3-D printing head and the inkjet head, configured to obtain a layer thickness of a layer object for forming a 3-D object and configured to adjust an ink discharge volume of an ink layer corresponding to the layer object according to the layer thickness, wherein the ink discharge volume is in positive correlation with the layer thickness of the layer object, wherein after the controller is configured to control the 3-D printing head to melt and print out a building material on the platform according to the layer thickness to form the layer object, the controller is configured to control the inkjet head to apply at least one ink on an upper surface of the layer object according to the ink discharge volume, so as to form the ink layer over the layer object, wherein after the ink layer formed on the layer object, the controller is configured to control the 3-D printing head to melt and print out the building material on the platform according to another layer thickness to form another layer object over the ink layer and then is configured to control the inkjet head to apply the ink on an upper surface of the another layer object according to another ink discharge volume to form another ink layer over the another layer object.

9. The 3-D printing apparatus according to claim 8, wherein the ink comprises a plurality of color ink respectively corresponding to different colors, and the controller adjusts the ink discharge volume of each color ink in the ink layer according to the layer thickness.

10. The 3-D printing apparatus according to claim 9, wherein the colors of the color ink comprise cyan, magenta, yellow and black in accordance with printing primary colors.

11. The 3-D printing apparatus according to claim 9, wherein the controller is configured to obtain a relation polynomial and is configured to adjust the ink discharge volume from a predetermined reference value corresponding to a reference thickness to an ideal value by substituting the layer thickness into the relation polynomial.

12. The 3-D printing apparatus according to claim 11, wherein a constant term of the relation polynomial is the predetermined reference value.

13. The 3-D printing apparatus according to claim 11, wherein the relation polynomial is a quadratic polynomial.

14. The 3-D printing apparatus according to claim 11, wherein the controller is configured to select the relation polynomial from a plurality of preset polynomials according to a material type of the building material.

15. The 3-D printing apparatus according to claim 8, wherein the controller is configured to adjust the another ink discharge volume of the another ink layer corresponding to the another layer object according to the another layer thickness of the another layer object, the another layer thickness is different form the layer thickness, and the another ink discharge volume of the another ink layer is different from the ink discharge volume of the ink layer.

* * * * *